(12) United States Patent
Geng et al.

(10) Patent No.: US 10,982,579 B2
(45) Date of Patent: Apr. 20, 2021

(54) METHOD AND APPARATUS FOR MANAGING FLOW THROUGH AN EXHAUST AFTERTREATMENT SYSTEM

(71) Applicant: GM GLOBAL TECHNOLOGY OPERATIONS LLC, Detroit, MI (US)

(72) Inventors: Jianyang Geng, South Lyon, MI (US); David N. Belton, Milford, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 16/508,844

(22) Filed: Jul. 11, 2019

(65) Prior Publication Data

US 2021/0010405 A1    Jan. 14, 2021

(51) Int. Cl.

| F01N 3/08 | (2006.01) |
| F01N 3/20 | (2006.01) |
| F01N 9/00 | (2006.01) |
| F01N 11/00 | (2006.01) |
| F01N 13/00 | (2010.01) |
| F02D 41/12 | (2006.01) |

(52) U.S. Cl.
CPC .......... *F01N 3/2053* (2013.01); *F01N 3/0878* (2013.01); *F01N 9/00* (2013.01); *F01N 11/00* (2013.01); *F01N 13/009* (2014.06); *F02D 41/123* (2013.01); *F01N 2410/00* (2013.01); *F01N 2410/12* (2013.01); *F01N 2900/08* (2013.01); *F01N 2900/1402* (2013.01)

(58) Field of Classification Search
CPC ........ F01N 3/0878; F01N 3/2053; F01N 9/00; F01N 11/00; F01N 13/009; F01N 2410/00; F01N 2410/12; F01N 2900/08; F01N 2900/1402; F02D 41/123
See application file for complete search history.

(56) References Cited

U.S. PATENT DOCUMENTS

| 2017/0321617 A1* | 11/2017 | Kalluri .................. F02D 41/123 |
| 2018/0038257 A1* | 2/2018 | Uhrich ..................... F01N 5/02 |
| 2019/0017423 A1* | 1/2019 | Martin .................... F01N 9/002 |

* cited by examiner

*Primary Examiner* — Audrey K Bradley
(74) *Attorney, Agent, or Firm* — Quinn IP Law

(57) ABSTRACT

A system operates to bypass one or more exhaust purifying devices during deceleration fuel cut-off (DFCO) events in order to avoid hydrocarbon purging. The system includes an internal combustion engine and exhaust purifying system including a first purifying device and a second purifying device. An exhaust gas sensor monitors an exhaust gas feedstream. A diverter valve is disposed to manage the exhaust gas feedstream and fluidly coupled to an exhaust diversion pipe. A controller detects operation of the engine in a DFCO state and monitors the exhaust gas feedstream via the exhaust sensor. The diverter valve is controlled to divert the exhaust gas feedstream away from at least one of the first and second purifying devices during the DFCO event when the exhaust gas feedstream has an air/fuel ratio that is greater than a threshold air/fuel ratio.

13 Claims, 4 Drawing Sheets

METHOD AND APPARATUS FOR MANAGING FLOW THROUGH AN EXHAUST AFTERTREATMENT SYSTEM

INTRODUCTION

Internal combustion engines may be employed on vehicles to provide mechanical power for tractive effort. During a deceleration event, fuel flow to an internal combustion engine may be discontinued, referred to as a deceleration fuel cut-off (DFCO) event. During a DFCO event, fresh air will flow through the engine and into an attached exhaust purifying system, which may result in hydrocarbon purging. When the DFCO event ends and engine refueling begins, stoichiometric fueling of the engine may result in a lean mixture in the exhaust purifying system, which may increase NOx emissions. One possible response to counter this effect is to operate the engine at a rich air/fuel ratio, which can negatively affect fuel economy.

SUMMARY

An engine system operates to bypass one or more exhaust purifying devices during deceleration fuel cut-off (DFCO) events in order to avoid hydrocarbon purging, thus minimizing or eliminating a need for engine operation at a rich air/fuel ratio immediately subsequent to a DFCO event, thus reducing fuel consumption.

A system includes an internal combustion engine that is fluidly coupled via an exhaust pipe to an exhaust purifying system, wherein the exhaust purifying system includes a first purifying device fluidly coupled to a second purifying device. An exhaust gas sensor is disposed in the exhaust pipe upstream of the first purifying device to monitor an exhaust gas feedstream. At least one diverter valve is disposed to manage the exhaust gas feedstream in the purifying system. The at least one diverter valve is fluidly coupled to an exhaust diversion pipe. A controller is operatively connected to the internal combustion engine, the exhaust gas sensor and the diverter valve. The controller includes an instruction set that is executable to detect operation of the engine in a DFCO state and monitor the exhaust gas feedstream via the exhaust sensor. The at least one diverter valve is controlled to divert the exhaust gas feedstream away from at least one of the first and second purifying devices during the DFCO event when the exhaust gas feedstream has an air/fuel ratio that is greater than a threshold air/fuel ratio.

An aspect of the disclosure includes the at least one diverter valve being a first diverter valve that is disposed upstream of the first purifying device. The instruction set is executable to control the first diverter valve to divert the exhaust gas feedstream through the exhaust diversion pipe away from the first and the second purifying devices during the DFCO event when the exhaust gas feedstream has an air/fuel ratio that is greater than the threshold air/fuel ratio.

Another aspect of the disclosure includes the at least one diverter valve being a first diverter valve that is disposed upstream of the first purifying device, a second diverter valve that is disposed between the first and second purifying devices, and a third diverter valve that is disposed downstream of the second purifying device. The instruction set is executable to control the first, second and third diverter valves to divert the exhaust gas feedstream through the exhaust diversion pipe away from the first and the second purifying devices during the DFCO event when the exhaust gas feedstream has an air/fuel ratio that is greater than the threshold air/fuel ratio.

Another aspect of the disclosure includes the at least one diverter valve being a first diverter valve that is disposed upstream of the first purifying device, a second diverter valve that is disposed between the first and second purifying devices, and a third diverter valve that is disposed downstream of the second purifying device. The instruction set is executable to control the first, second and third diverter valves to divert the exhaust gas feedstream through the exhaust diversion pipe away from the first purifying device and through the second purifying device during the DFCO event when the exhaust gas feedstream has an air/fuel ratio that is greater than the threshold air/fuel ratio.

Another aspect of the disclosure includes the at least one diverter valve being a first diverter valve that is disposed upstream of the first purifying device, a second diverter valve that is disposed between the first and second purifying devices, and a third diverter valve that is disposed downstream of the second purifying device. The instruction set is executable to control the first, second and third diverter valves to divert the exhaust gas feedstream through the first purifying device and through the exhaust diversion pipe away from the second purifying device during the DFCO event when the exhaust gas feedstream has an air/fuel ratio that is greater than the threshold air/fuel ratio.

Another aspect of the disclosure includes the at least one diverter valve being a first diverter valve that is disposed upstream of the first purifying device and a second diverter valve that is disposed between the first and second purifying devices. The instruction set is executable to control the first and second diverter valves to divert the exhaust gas feedstream through the exhaust diversion pipe away from the first purifying device and through the second purifying device during the DFCO event when the exhaust gas feedstream has an air/fuel ratio that is greater than the threshold air/fuel ratio.

Another aspect of the disclosure includes the at least one diverter valve being a first diverter valve that is disposed between the first and second purifying devices, and a second diverter valve that is disposed downstream of the second purifying device. The instruction set is executable to control the first and second diverter valves to divert the exhaust gas feedstream through the exhaust diversion pipe away from the second purifying device during the DFCO event when the exhaust gas feedstream has an air/fuel ratio that is greater than the threshold air/fuel ratio.

Another aspect of the disclosure includes the engine being fluidly coupled to an evaporative canister via an evaporative canister purge valve. The threshold air/fuel ratio is selected to delay controlling the diverter valve to divert the exhaust gas feedstream away from at least one of the first and second purifying devices during the DFCO event until completion of an evaporative canister purge event.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. For purposes of convenience and clarity only, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein. As employed herein, the term "upstream" and related terms refer to elements that are towards an origination of a flow stream relative to an indicated location, and the term "downstream" and related terms refer to elements that are away from an origination of a flow stream relative to an indicated location. As employed herein, the term "system" or module may refer to combination or collection of mechanical and electrical hardware, software, firmware, electronic control component, processing logic, and/or processor device, individually or in combination that interact to provide a described function or operation.

Figure 1:
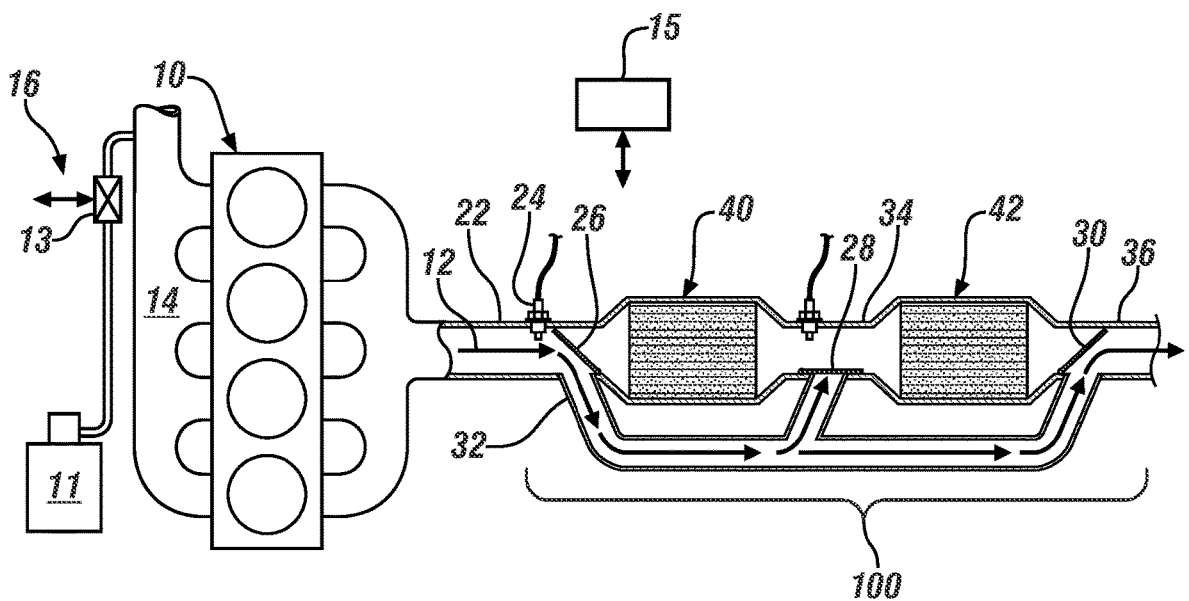
FIG. 1 schematically illustrates an engine and a first embodiment of an exhaust purifying system that may be disposed on a vehicle, in accordance with the disclosure.

Referring to the drawings, wherein like reference numerals correspond to like or similar components throughout the several Figures, FIG. 1, consistent with embodiments disclosed herein, schematically illustrates an internal combustion engine (engine) 10 and a first embodiment of an exhaust purifying system 100 that may be disposed on a vehicle (not shown). The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The engine 10 is fluidly coupled to the exhaust purifying system 100 via one or more exhaust manifolds, runners, pipes, etc., indicated by numeral 22. The engine 10 is operable to generate an exhaust gas feedstream 12, which is monitored by an exhaust gas sensor 24. The exhaust gas sensor 24 may be a wide-range air/fuel ratio sensor, a NOx sensor, or another device capable of monitoring the exhaust gas feedstream 12. A controller 15 is arranged to monitor various engine sensors, including the exhaust gas sensor 24, and control operation of the engine 10 based thereon. In one embodiment, the engine 10 is controlled to primarily operate at a stoichiometric air/fuel ratio, wherein the exhaust gas feedstream 12 has an air/fuel ratio that is at or about 14.6:1.

The engine 10 is arranged to operate in various operating modes in response to a driver request. The operating modes include a torque generation mode in response to a driver request for acceleration, and a coasting mode in response to a driver request for deceleration. The coasting mode may include a deceleration fuel cut-off (DFCO) mode, during which engine operation includes discontinuing fuel flow to the engine 10 while the engine 10 remains spinning with air flowing therethrough. During operation in the DFCO mode, the engine 10 is operating at a lean air/fuel ratio, i.e., at an air/fuel ratio that is greater than 14.6:1 as air flows through the engine 10 without fuel.

The exhaust purifying system 100 includes a first purifying device 40 that is disposed upstream of and fluidly connected to a second purifying device 42 via an intermediary pipe 34. A third pipe 36 is fluidly connected downstream of the second purifying device 42. In one embodiment, the first and second exhaust purifying devices 40, 42 are configured as three-way catalytic devices, meaning that they include a first catalytic material that supports reduction of NOx gases and a second catalytic material that supports oxidation of hydrocarbon and carbon monoxide gases that are contained in the exhaust gas feedstream 12 as byproducts of the engine combustion.

This embodiment of the exhaust purifying system 100 includes a first diverter valve 26 disposed upstream of the first exhaust purifying device 40, a second diverter valve 28 disposed between the first and second exhaust purifying devices 40, 42, and a third diverter valve 30 disposed downstream of the second exhaust purifying device 42. A diversion pipe 32 fluidly couples to each of the first, second and third diverter valves 26, 28, 30.

The controller 15 is arranged to control positions of each the first, second and third diverter valves 26, 28, 30. The first, second and third diverter valves 26, 28, 30 and the diversion pipe 32 are arranged to selectively channel flow of the exhaust gas feedstream 12 through both the first and second exhaust purifying devices 40, 42, to selectively channel flow of the exhaust gas feedstream 12 through only the first exhaust purifying device 40 while bypassing the second exhaust purifying device 42, to selectively channel flow of the exhaust gas feedstream 12 through only the second exhaust purifying device 42 while bypassing the first exhaust purifying device 40, and to selectively channel flow of the exhaust gas feedstream 12 to bypass both the first and second exhaust purifying devices 40, 42. As shown, the first, second and third diverter valves 26, 28, 30 are controlled to divert flow of the exhaust gas feedstream 12 through the diversion pipe 32 and bypass both the first and second exhaust purifying devices 40, 42.

Figure 2:
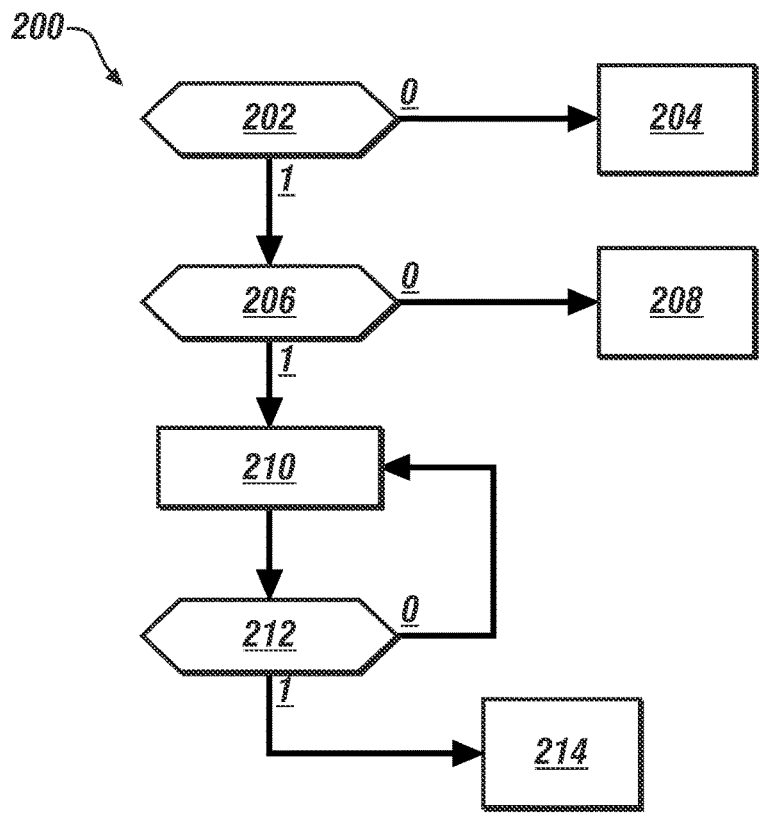
FIG. 2 schematically illustrates a flowchart for controlling operation of the engine and exhaust purifying system described with reference to FIG. 1, in response to a driver request, in accordance with the disclosure.

FIG. 2 schematically illustrates a control routine 200 for controlling operation of the engine 10 and the first, second and third diverter valves 26, 28, 30 described with reference to FIG. 1, in response to a driver request. As employed herein, the term "1" indicates an answer in the affirmative, or "YES", and the term "0" indicates an answer in the negative, or "NO".

When the driver request does not include operation in the coasting mode that includes a request to operate in the DFCO mode (202)(0), engine operation is commanded to a default state (204), which may be operation at a stoichiometric air/fuel ratio. When the driver request includes operation in the coasting mode along with a request to operate in the DFCO mode (202)(1), the controller 15 monitors the air/fuel ratio of the exhaust gas feedstream 12 via the exhaust gas sensor 24. When the air/fuel ratio is greater than a threshold air/fuel ratio level (206)(0), the controller 15 controls operation in a half-bypass mode to divert flow of the exhaust gas feedstream 12 around either the first exhaust purifying device 40 or the second exhaust purifying device 42 (208). The threshold air/fuel ratio level is a calibratable parameter having a single value or an array of values that may be contained in a lookup table. In one embodiment, the calibratable value may include a time delay that is determined based upon the exhaust air/fuel ratio after initiation of the DFCO mode, or, alternatively, status of an evaporative canister purge event. The status of an evaporative canister purge event is relevant in that hydrocarbon gas vapor may be drawn into an intake air system 14 of the engine 10 when an evaporative canister purge valve 13 is activated to purge an evaporative canister 11, thus affecting a need for exhaust purification during operation in the DFCO mode. Thus the calibratable threshold value may be selected to delay implementation of diversion of the exhaust gas feedstream 12 around either the first exhaust purifying device 40 or the second exhaust purifying device 42 during a DFCO event until completion of an evaporative canister purge event. The evaporative canister 11 and evaporative canister purge valve 13 are elements of an evaporative emissions management system 16 that is disposed to capture hydrocarbon vapors from a vehicle liquid fuel storage system (not shown). The evaporative canister purge valve 13 is interposed in a fluidic line that fluidly couples the evaporative canister 11 to the intake air system 14 of the engine 10. The controller 15 controls activation of the evaporative canister purge valve to control purging of the evaporative canister under certain conditions, such as engine operation in the DFCO mode.

The half-bypass mode may be commanded when the DFCO mode is initially activated, and may be initially delayed to accommodate purge of hydrocarbon vapors from the evaporative canister (not shown) through the engine 10 that may be commanded during operation in the DFCO mode. The half-bypass mode includes, in one embodiment, controlling the first, second and third diverter valves 26, 28, 30 to selectively channel flow of the exhaust gas feedstream 12 through only the first exhaust purifying device 40 while bypassing the second exhaust purifying device 42. Alternatively, the half-bypass mode includes, in one embodiment, controlling the first, second and third diverter valves 26, 28, 30 to selectively channel flow of the exhaust gas feedstream 12 through only the second exhaust purifying device 42 while bypassing the first exhaust purifying device 40.

When the air/fuel ratio is less than the threshold air/fuel ratio level (206)(1), the controller 15 channels flow of the exhaust gas feedstream 12 to bypass both the first and second exhaust purifying devices 40, 42 (210), also referred to as a full bypass mode. During operation in the full bypass mode (210), the controller 15 monitors the driver request (212). Operation in the full bypass mode continues when the driver request continues in the coasting mode (212)(0). When the driver request transitions from the coasting mode to a driver request for acceleration (212)(1), the controller 15 discontinues operation in the DFCO mode and controls the first, second and third diverter valves 26, 28, 30 to channel flow of the exhaust gas feedstream 12 through both the first and second exhaust purifying devices 40, 42 (214). The controller 15 commands operation of the engine at a stoichiometric air/fuel ratio immediately subsequent to discontinuing operation in the DFCO mode. Under certain operating conditions, the controller 15 may instead command operation of the engine 10 at a rich air/fuel ratio for a brief period immediately subsequent to operation in the DFCO mode in order to purge excess oxygen from the first and second exhaust purifying devices 40, 42, although the brief period is of limited duration.

Figure 3:
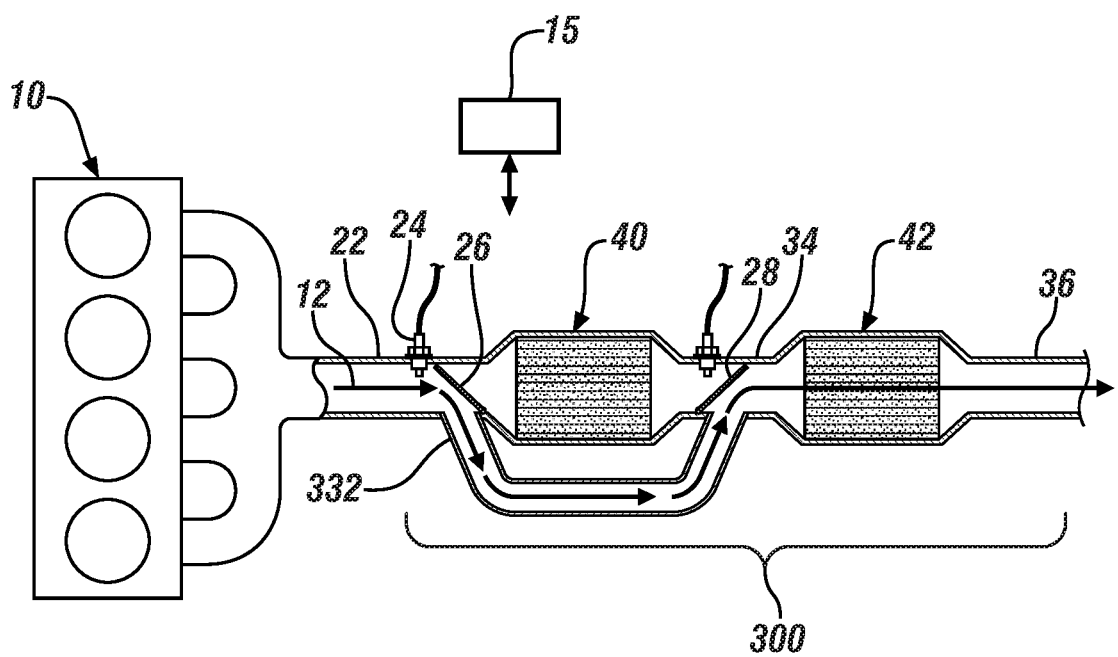
FIG. 3 schematically illustrates an engine and a second embodiment of an exhaust purifying system that may be disposed on a vehicle, in accordance with the disclosure.

FIG. 3 schematically illustrates the engine 10 and a second embodiment of the exhaust purifying system 300, which may be disposed on a vehicle (not shown). The engine 10 is fluidly coupled to the exhaust purifying system 300 via one or more exhaust manifolds, runners, pipes, etc., and is indicated by numeral 22.

This embodiment of the exhaust purifying system 300 includes the first diverter valve 26 being disposed upstream of the first exhaust purifying device 40, and the second diverter valve 28 being disposed between the first and second exhaust purifying devices 40, 42. There is no third diverter valve in this embodiment. A diversion pipe 332 fluidly couples to each of the first and second diverter valves 26, 28, which are selectively controllable to effect a fluidic bypass around first exhaust purifying device 40.

The controller 15 is arranged to control positions of each the first and second diverter valves 26, 28. The first and second diverter valves 26, 28 and the diversion pipe 332 are arranged to selectively channel flow of the exhaust gas feedstream 12 through both the first and second exhaust purifying devices 40, 42, and to operate in the half-bypass mode to selectively channel flow of the exhaust gas feedstream 12 through only the second exhaust purifying device 42 while bypassing the first exhaust purifying device 40. As shown, the first and second diverter valves 26, 28 are controlled to divert flow of the exhaust gas feedstream 12 through the diversion pipe 32 and bypass the first exhaust purifying device 40.

Figure 4:
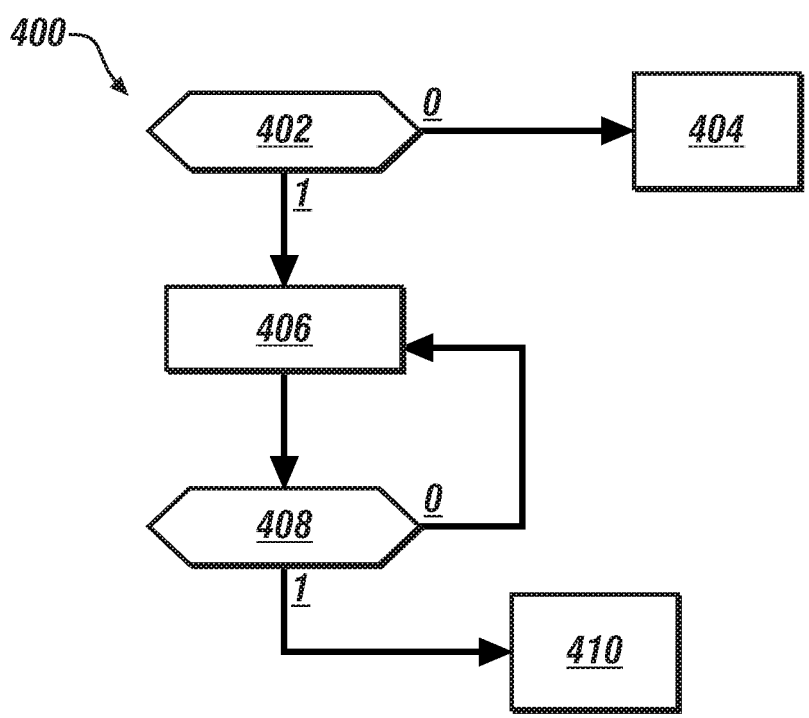
FIG. 4 schematically illustrates a flowchart for controlling operation of the engine and exhaust purifying system described with reference to FIG. 3, in response to a driver request, in accordance with the disclosure.

FIG. 4 schematically illustrates a control routine 400 for controlling operation of the engine 10 and the first and second diverter valves 26, 28 described with reference to FIG. 3, in response to a driver request. When the driver request does not include operation in the coasting mode that includes a request to operate in the DFCO mode (402)(0), engine operation is commanded to a default state (404), which may be operation at a stoichiometric air/fuel ratio. When the driver request includes operation in the coasting mode along with a request to operate in the DFCO mode (402)(1), the controller 15 controls operation in the half-bypass mode to divert flow of the exhaust gas feedstream 12 around the first exhaust purifying device 40 (406). The half-bypass mode includes controlling the first and second diverter valves 26, 28 to selectively channel flow of the exhaust gas feedstream 12 to bypass only the first exhaust purifying device 40 while permitting flow of the exhaust gas feedstream 12 through the second exhaust purifying device 42.

Operation in the half-bypass mode continues when the driver request continues in the coasting mode, prior to refueling the engine 10 (408)(0). When the driver request transitions from the coasting mode to a driver request for acceleration (408)(1), the controller 15 discontinues operation in the DFCO mode and controls the first and second diverter valves 26, 28 to channel flow of the exhaust gas feedstream 12 through both the first and second exhaust purifying devices 40, 42 (410). The controller 15 commands operation of the engine at a stoichiometric air/fuel ratio immediately subsequent to discontinuing operation in the DFCO mode. Under certain operating conditions, the controller 15 may instead command operation of the engine 10 at a rich air/fuel ratio for a brief period immediately subsequent to operation in the DFCO mode in order to purge excess oxygen from the first and second exhaust purifying devices 40, 42, although the brief period is of limited duration.

Figure 5:
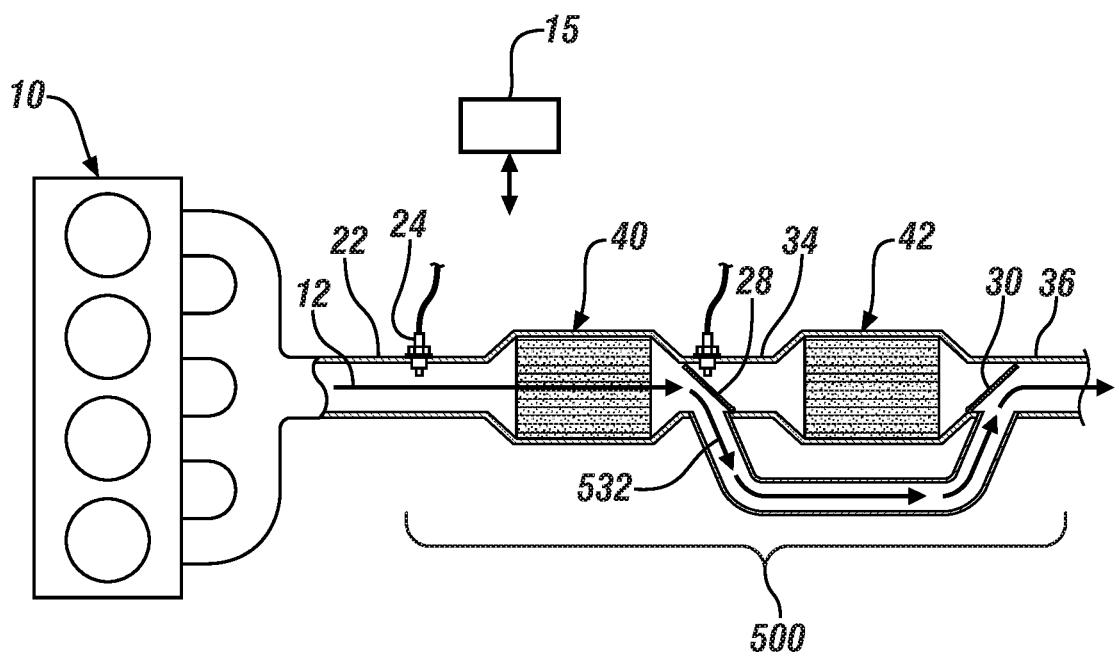
FIG. 5 schematically illustrates an engine and a third embodiment of an exhaust purifying system that may be disposed on a vehicle, in accordance with the disclosure.

FIG. 5 schematically illustrates the engine 10 and a third embodiment of the exhaust purifying system 500, which may be disposed on a vehicle (not shown). The engine 10 is fluidly coupled to the exhaust purifying system 500 via one or more exhaust manifolds, runners, pipes, etc., and is indicated by numeral 22.

This embodiment of the exhaust purifying system 500 includes the second diverter valve 28 being disposed between the first and second exhaust purifying devices 40, 42, and the third diverter valve 30 being disposed downstream of the second exhaust purifying device 42. There is no first diverter valve 26 in this embodiment. The diversion pipe 432 fluidly couples to each of the second and third diverter valves 28, 30, which are selectively controllable to effect a fluidic bypass around second exhaust purifying device 42.

The controller 15 is arranged to control positions of each the second and third diverter valves 28, 30. The second and third diverter valves 28, 30 and the diversion pipe 532 are arranged to selectively channel flow of the exhaust gas feedstream 12 through both the first and second exhaust purifying devices 40, 42, and to operate in the half-bypass mode to selectively channel flow of the exhaust gas feedstream 12 through only the first exhaust purifying device 40 and bypass the second exhaust purifying device 42. As shown, the second and third diverter valves 28, 30 are controlled to divert flow of the exhaust gas feedstream 12 through the diversion pipe 32 and bypass the second exhaust purifying device 42.

Figure 6:
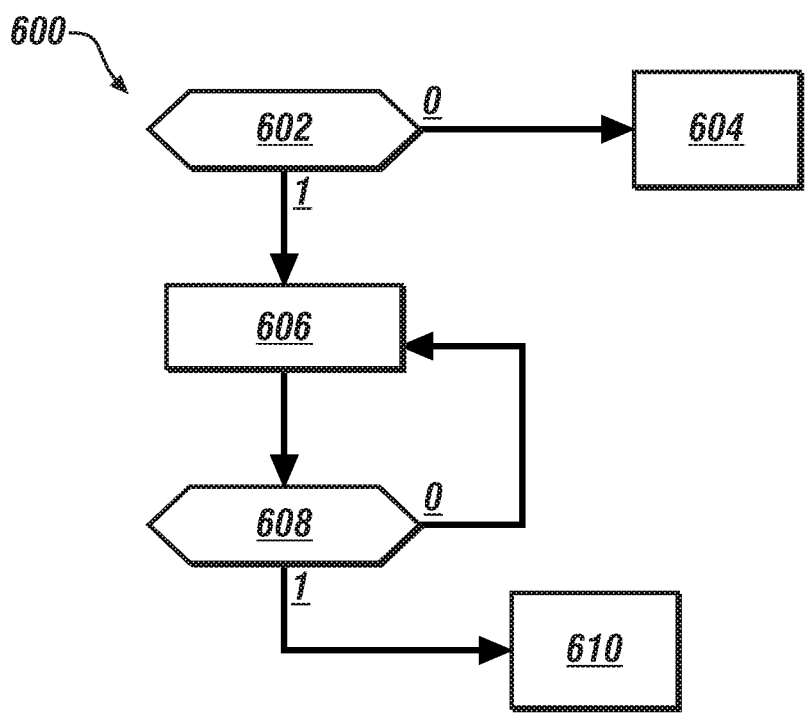
FIG. 6 schematically illustrates a flowchart for controlling operation of the engine and exhaust purifying system described with reference to FIG. 5, in response to a driver request, in accordance with the disclosure.

FIG. 6 schematically illustrates a control routine 600 to control operation of the engine 10 and control of the second and third diverter valves 28, 30 described with reference to FIG. 5, in response to a driver request. When the driver request does not include operation in the coasting mode that includes a request to operate in the DFCO mode (602)(0), engine operation is commanded to a default state (604), which may be operation at a stoichiometric air/fuel ratio. When the driver request includes operation in the coasting mode along with a request to operate in the DFCO mode (602)(1), the controller 15 controls operation in the half-bypass mode to divert flow of the exhaust gas feedstream 12 around the second exhaust purifying device 42 (606). The half-bypass mode includes controlling the second and third diverter valves 28, 30 to selectively channel flow of the exhaust gas feedstream 12 to bypass only the second exhaust purifying device 42 while permitting flow of the exhaust gas feedstream 12 through the first exhaust purifying device 40.

Operation in the half-bypass mode continues when the driver request continues in the coasting mode, prior to refueling the engine 10 (608)(0). When the driver request transitions from the coasting mode to a driver request for acceleration (608)(1), the controller 15 discontinues operation in the DFCO mode and controls the second and third diverter valves 28, 30 to channel flow of the exhaust gas feedstream 12 through both the first and second exhaust purifying devices 40, 42 (610). The controller 15 commands operation of the engine at a stoichiometric air/fuel ratio immediately subsequent to discontinuing operation in the DFCO mode. Under certain operating conditions, the controller 15 may instead command operation of the engine 10 at a rich air/fuel ratio for a brief period immediately subsequent to operation in the DFCO mode in order to purge excess oxygen from the first and second exhaust purifying devices 40, 42, although the brief period is of limited duration.

Figure 7:
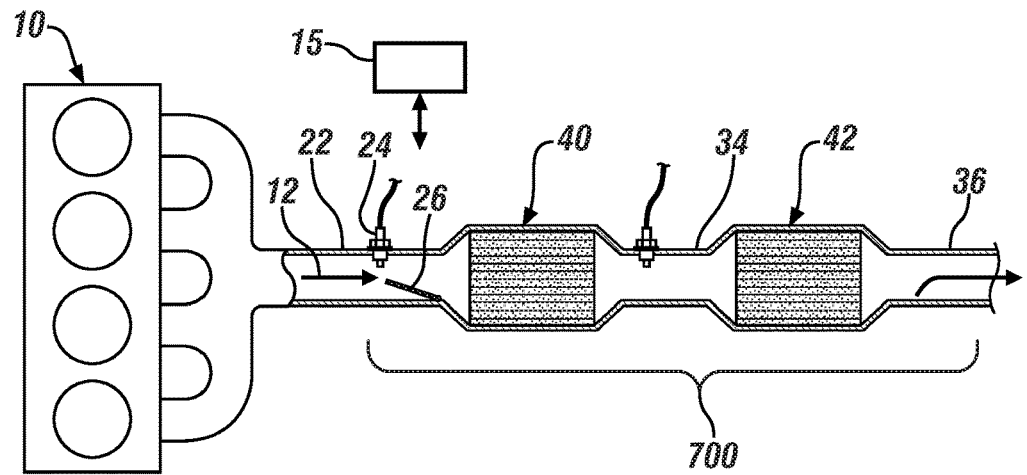
FIG. 7 schematically illustrates an engine and a fourth embodiment of an exhaust purifying system that may be disposed on a vehicle, in accordance with the disclosure.

FIG. 7 schematically illustrates the engine 10 and a fourth embodiment of the exhaust purifying system 700, which may be disposed on a vehicle (not shown). The engine 10 is fluidly coupled to the exhaust purifying system 700 via one or more exhaust manifolds, runners, pipes, etc., and is indicated by numeral 22.

This embodiment of the exhaust purifying system 700 includes the first diverter valve 26 being disposed upstream of both the first and second exhaust purifying devices 40, 42. There is no second or third diverter valve or diversion pipe in this embodiment. The controller 15 is arranged to control position of the first diverter valve 26. The first diverter valve is arranged to selectively control flow of the exhaust gas feedstream 12 through both the first and second exhaust purifying devices 40, 42. As shown, the first diverter valve 26 is controlled to partially restrict flow of the exhaust gas feedstream 12 to both the first and second exhaust purifying devices 40, 42.

Figure 8:
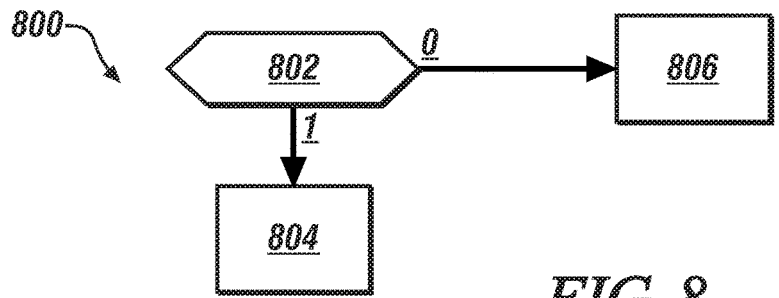
FIG. 8 schematically illustrates a flowchart for controlling operation of the engine and exhaust purifying system described with reference to FIG. 7, in response to a driver request, in accordance with the disclosure.

FIG. 8 schematically illustrates a control routine 800 to control operation of the engine 10 and control of the first diverter valve 26 described with reference to FIG. 6, in response to a driver request. When the driver request does not include operation in the coasting mode that includes a request to operate in the DFCO mode (802)(0), engine operation is commanded to a default state (806), which may include operation at a stoichiometric air/fuel ratio. When the driver request includes operation in the coasting mode along with a request to operate in the DFCO mode (802)(1), the controller 15 controls operation of the first diverter valve 26 (804), which includes controlling the first diverter valve 26 to selectively limit flow of the exhaust gas feedstream 12 to minimize flow of the lean exhaust gas feedstream through the first and second exhaust purifying devices 40, 42. When the driver request transitions from the coasting mode to a driver request for acceleration, the controller 15 discontinues operation in the DFCO mode and controls the first diverter valve 26 to the open state. The controller 15 commands operation of the engine at a stoichiometric air/fuel ratio immediately subsequent to discontinuing operation in the DFCO mode. Under certain operating conditions, the controller 15 may instead command operation of the engine 10 at a rich air/fuel ratio for a brief period immediately subsequent to operation in the DFCO mode in order to purge excess oxygen from the first and second exhaust purifying devices 40, 42, although the brief period is of limited duration.

Figure 9:
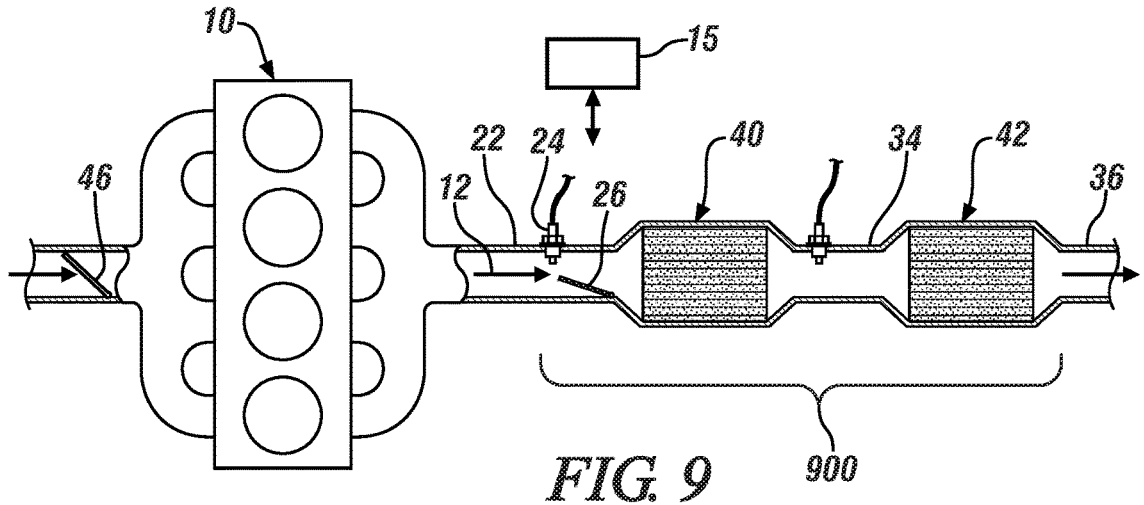
FIG. 9 schematically illustrates an engine and a fifth embodiment of an exhaust purifying system that may be disposed on a vehicle, in accordance with the disclosure.

FIG. 9 schematically illustrates the engine 10 and a fifth embodiment of the exhaust purifying system 900, which may be disposed on a vehicle (not shown). The engine 10 is fluidly coupled to the exhaust purifying system 900 via one or more exhaust manifolds, runners, pipes, etc., and is indicated by numeral 22. This embodiment of the exhaust purifying system 900 includes the first diverter valve 26 being disposed upstream of both the first and second exhaust purifying devices 40, 42. There is no second or third diverter valve or diversion pipe in this embodiment. An intake air control valve 46 is disposed in an intake manifold (not shown) to control intake air flow. The controller 15 is arranged to control positions of the first diverter valve 26 and the intake air control valve 46. The first diverter valve 26 and the intake air control valve 46 are arranged to selectively control flow of the exhaust gas feedstream 12 through both the first and second exhaust purifying devices 40, 42. As shown, the first diverter valve 26 and the intake air control valve 46 are controlled to partially restrict airflow through the engine 10 and flow through the exhaust gas feedstream 12 to both the first and second exhaust purifying devices 40, 42.

Figure 10:
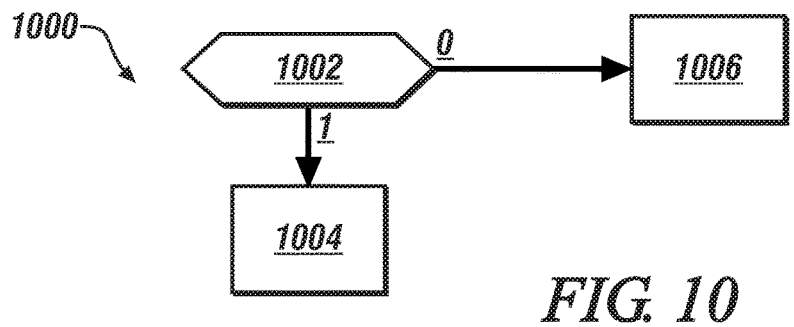
FIG. 10 schematically illustrates a flowchart for controlling operation of the engine and exhaust purifying system described with reference to FIG. 9, in response to a driver request, in accordance with the disclosure.

FIG. 10 schematically illustrates a control routine 1000 to control operation of the engine 10 and control of the first diverter valve 26 and the intake air control valve 46 described with reference to FIG. 8, in response to a driver request. When the driver request does not include operation in the coasting mode that includes a request to operate in the DFCO mode (1002)(0), engine operation is commanded to a default state (1006), which may include operation at a stoichiometric air/fuel ratio. When the driver request includes operation in the coasting mode along with a request to operate in the DFCO mode (1002)(1), the controller 15 controls operation of the first diverter valve 26 and the intake air control valve 46 (1004), which includes controlling the intake air control valve 46 and the first diverter valve 26 to selectively limit flow of the exhaust gas feedstream 12 to minimize flow of the lean exhaust gas feedstream through the first and second exhaust purifying devices 40, 42. When the driver request transitions from the coasting mode to a driver request for acceleration, the controller 15 discontinues operation in the DFCO mode and controls the first diverter valve 26 to the open state, and controls the intake air control valve 46 in response to the driver request. The controller 15 commands operation of the engine at a stoichiometric air/fuel ratio immediately subsequent to discontinuing operation in the DFCO mode. Under certain operating conditions, the controller 15 may instead command operation of the engine 10 at a rich air/fuel ratio for a brief period immediately subsequent to operation in the DFCO mode in order to purge excess oxygen from the first and second exhaust purifying devices 40, 42, although the brief period is of limited duration.

The concepts described herein act to decouple all or a portion of the exhaust purifying system from the engine 10 during engine operation in the DFCO mode. Decoupling all or a portion of the exhaust purifying system from the engine 10 in the manner described herein minimizes oxygen loading and maintains one or more exhaust gas constituents in the exhaust purifying system during operation in the DFCO mode. Oxygen loading in the exhaust purifying system during operation in the DFCO mode reduces NOx conversion by the exhaust purifying system during a subsequent operation of the engine 10. Thus, the concepts described herein serve to minimize or eliminate a need for post-DFCO fuel enrichment, thus reducing fuel consumption.

The term "controller" and related terms such as control module, module, control, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers.

The terms "calibration", "calibrated", and related terms refer to a result or a process that compares an actual or standard measurement associated with a device or system with a perceived or observed measurement or a commanded position for the device or system. A calibration as described herein can be reduced to a storable parametric table, a plurality of executable equations or another suitable form that may be employed as part of a measurement or control routine.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A system, comprising:
an internal combustion engine fluidly coupled via an exhaust pipe to an exhaust purifying system, wherein the exhaust purifying system includes a first purifying device fluidly coupled to a second purifying device;
an exhaust gas sensor disposed in the exhaust pipe upstream of the first purifying device to monitor an exhaust gas feedstream;
at least one diverter valve disposed to manage the exhaust gas feedstream in the exhaust purifying system including a first diverter valve that is disposed upstream of the first purifying device:
the at least one diverter valve fluidly coupled to an exhaust diversion pipe;
a controller, operatively connected to the internal combustion engine, the exhaust gas sensor and the at least one diverter valve, the controller including an instruction set that is executable to:
detect operation of the engine in a Deceleration Fuel Cut-Off (DFCO) state;
monitor, via the exhaust gas sensor, air/fuel ratio of the exhaust gas feedstream via the exhaust sensor; and
control the first diverter valve to divert the exhaust gas feedstream through the exhaust diversion pipe away from the first and second purifying devices during operation of the engine in the DFCO state when the exhaust gas feedstream has an air/fuel ratio that is greater than a threshold air/fuel ratio.

2. The system of claim 1, wherein the at least one diverter valve further includes a second diverter valve that is disposed between the first and second purifying devices and a third diverter valve that is disposed downstream of the second purifying device, and wherein the instruction set is executable to control the first, second and third diverter valves to divert the exhaust gas feedstream through the exhaust diversion pipe away from the first and the second purifying devices during operation of the engine in the DFCO state when the exhaust gas feedstream has an air/fuel ratio that is greater than the threshold air/fuel ratio.

3. The system of claim 1, wherein the at least one diverter valve further includes a second diverter valve that is disposed between the first and second purifying devices.

4. The system of claim 1, wherein the at least one diverter valve further includes a first second diverter valve that is disposed between the first and second purifying devices, and a third diverter valve that is disposed downstream of the second purifying device.

5. A system, comprising:
an internal combustion engine fluidly coupled via an exhaust pipe to an exhaust purifying system, wherein the exhaust purifying system includes a first purifying device fluidly coupled to a second purifying device;
an exhaust gas sensor disposed in the exhaust pipe upstream of the first purifying device to monitor an exhaust gas feedstream;
at least one diverter valve disposed to manage the exhaust gas feedstream in the exhaust purifying system;
an evaporative emissions management system including an evaporative canister and evaporative canister purge valve; and
a controller, operatively connected to the internal combustion engine, the exhaust gas sensor, the evaporative canister purge valve, and the at least one diverter valve, the controller including an instruction set that is executable to:
detect operation of the engine in a Deceleration Fuel Cut-Off (DFCO) state;
monitor the exhaust gas feedstream via the exhaust sensor; and
control the at least one diverter valve to divert the exhaust gas feedstream through an exhaust diversion pipe away from at least one of the first and second purifying devices during the operation of the engine in the DFCO state when the exhaust gas feedstream has an air/fuel ratio that is greater than a threshold air/fuel ratio;
wherein the threshold air/fuel ratio is selected to delay controlling the at least one diverter valve to divert the exhaust gas feedstream away from at least one of the first and second purifying devices during operation of the engine in the DFCO state until completion of an evaporative canister purge event.

6. The system of claim 5, wherein the at least one diverter valve includes a first diverter valve that is disposed upstream of the first purifying device, wherein the instruction set is executable to control the first diverter valve to partially block flow of the exhaust gas feedstream during operation of the engine in the DFCO state when the exhaust gas feedstream has an air/fuel ratio that is greater than the threshold air/fuel ratio.

7. The system of claim 5, further comprising an intake air throttle disposed upstream of the internal combustion engine, wherein the at least one diverter valve includes a first diverter valve that is disposed upstream of the first purifying device, and wherein the instruction set is executable to control the intake air throttle and the first diverter valve to partially block airflow through the engine and block flow of the exhaust gas feedstream during operation of the engine in the DFCO state when the exhaust gas feedstream has an air/fuel ratio that is greater than the threshold air/fuel ratio.

8. The system of claim 5, further comprising the instruction set executable to control the at least one diverter valve to permit the exhaust gas feedstream to flow through the first and second purifying devices during operation of the engine in the DFCO state when the exhaust gas feedstream has an air/fuel ratio that is less than the threshold air/fuel ratio.

9. The system of claim 5, further comprising the instruction set executable to command operation of the engine at stoichiometry immediately after operation of the engine in the DFCO state.

10. The system of claim 5, wherein the at least one diverter valve is disposed upstream of the first purifying device, and wherein the instruction set is executable to activate the at least one diverter valve to divert the exhaust gas feedstream away from both of the first and the second purifying devices during operation of the engine in the DFCO state when the exhaust gas feedstream has an air/fuel ratio that is greater than the threshold air/fuel ratio.

11. A method for controlling an internal combustion engine (engine) fluidly coupled via an exhaust pipe to an exhaust purifying system, wherein the exhaust purifying system includes a first purifying device fluidly coupled to a second purifying device and at least one diverter valve, and wherein the engine is fluidly coupled to an evaporative canister via an evaporative canister purge valve, the method comprising:

detecting operation of the engine in a Deceleration Fuel Cut-Off (DFCO) state;

monitoring, via an exhaust gas sensor, the exhaust gas feedstream; and controlling the at least one diverter valve to divert the exhaust gas feedstream away from at least one of the first and second purifying devices during operation of the engine in the DFCO state when the exhaust gas feedstream has an air/fuel ratio that is greater than a threshold air/fuel ratio;

wherein the threshold air/fuel ratio is selected to delay controlling the at least one diverter valve to divert an exhaust gas feedstream away from at least one of the first and second purifying devices during the operation of the engine in the DFCO state until completion of an evaporative canister purge event.

12. The method of claim 11, wherein the diverter valve includes a first diverter valve that is disposed upstream of the first purifying device, wherein the method comprises controlling the first diverter valve to partially block flow of the exhaust gas feedstream during operation of the engine in the DFCO state when the exhaust gas feedstream has an air/fuel ratio that is greater than the threshold air/fuel ratio.

13. The method of claim 11, further comprising commanding operation of the engine at stoichiometry immediately after operation of the engine in the DFCO state is discontinued.

\* \* \* \* \*